United States Patent
Aksyuk et al.

(10) Patent No.: US 6,204,946 B1
(45) Date of Patent: Mar. 20, 2001

(54) RECONFIGURABLE WAVELENGTH DIVISION MULTIPLEX ADD/DROP DEVICE USING MICROMIRRORS

(75) Inventors: Vladimir A. Aksyuk, Piscataway; David J. Bishop, Summit; Joseph E. Ford, Oakhurst; James A. Walker, Howell, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/968,935

(22) Filed: Nov. 12, 1997

Related U.S. Application Data
(60) Provisional application No. 60/056,482, filed on Aug. 21, 1997.

(51) Int. Cl.[7] .................................................. H04J 14/02

(52) U.S. Cl. .......................... 359/131; 359/124; 359/129; 385/24

(58) Field of Search ............................ 359/124, 129–131, 359/128; 385/24

(56) References Cited

U.S. PATENT DOCUMENTS

| | | | | |
|---|---|---|---|---|
| 5,726,785 | * | 3/1998 | Chawki et al. | 359/130 |
| 5,812,291 | * | 9/1998 | Bendelli et al. | 359/129 |
| 5,926,300 | * | 7/1999 | Miyakawa et al. | 359/124 |

* cited by examiner

Primary Examiner—Kinfe-Michael Negash

(57) ABSTRACT

A WDM add/drop device for use in an optic communications system for adding and dropping optical wavelengths from a multiple-wavelength optical system. The device includes a set of lenses, a planar grating wavelength multiplexer and a micromirror array switchable for individual wavelengths of the multiple-wavelength signal between a transmit mode and a reflect mode. The grating angularly demultiplexes a multiple-wavelength optical signal in a first direction and the individual wavelengths are processed by the micromirror array and directed to the grating in a second direction. The micromirror array will either reflect select wavelengths to a first port or transmit select wavelengths to a second port. In a preferred embodiment, ports on a first multiport circulator input the multiple-wavelength optical signal to the WDM add/drop device and output the multiple-wavelength optical signal from the WDM add/drop device. A second multiport circulator provides to-be-added wavelengths to the WDM add/drop device and removes to-be-dropped wavelengths from the WDM add/drop device.

26 Claims, 2 Drawing Sheets

RECONFIGURABLE WAVELENGTH DIVISION MULTIPLEX ADD/DROP DEVICE USING MICROMIRRORS

RELATED APPLICATION

This application claims priority from U.S. Provisional Patent Application Ser. No. 60/056,482 which was filed on Aug. 21, 1997.

BACKGROUND OF THE INVENTION

I. Field of the Invention

This invention relates to optical devices for adding and dropping optical signals to an optical fiber carrying existing optical signals without interfering with the existing optical signals. More particularly, the present invention is directed to a wavelength division multiplex add/drop optical device using a micromirror array for transmitting and reflecting optical signals in an optical communications system.

II. Description of the Related Art

In wavelength division multiplexed optical networks it is increasingly important to be able to switch multiple independent wavelength signals into and out of a single fiber without disturbing the other channels. This task is presently accomplished by utilizing an assembly of separate components such as a pair of wavelength demultiplexers and a set of N two-by-two bypass exchange switches. As is known, one of the wavelength demultiplexers, also known as a router, separates a multifrequency optical input data signal into N multiple fibers, with each fiber carrying a single wavelength. The bypass exchange switches accept the added and dropped channels. The other wavelength multiplexer combines the existing wavelengths with the added wavelengths onto a single fiber for transmission in the communications system. Among the drawbacks of such a discrete component approach, however, are the cost and size of the individual components and the resulting overall cost and size of the system.

SUMMARY OF THE INVENTION

A wavelength division multiplexed (WDM) transmit/reflect unit is disclosed for transmitting and reflecting select wavelengths of a multiwavelength optical signal onto optic fibers in an optic communications network. The transmit/reflect unit includes a lens positioned at a first port and a second port for directing the incoming optical signal to a planar grating wavelength multiplexer which angularly disperses the wavelengths in the signal. A focusing lens focuses the angularly dispersed wavelengths for receipt by a micromirror array switchable between a transmitting mode and a reflecting mode. The transmitting mode directs select wavelengths of the incoming signal from one port to the other port and the reflecting mode directs an incoming signal from the first port back to the first port.

A reconfigurable WDM add/drop device is also disclosed. The add/drop device employs a WDM transmit/reflect unit, of the type described above, which is disposed between first and second 3-port circulators. The first circulator interfaces with one port on the transmit/reflect unit and receives, from an input port, an input multiwavelength optical signal and outputs, to an output port, a multiwavelength optical signal. The second circulator interfaces with another port on the transmit/reflect unit. The second circulator receives, from an add port, a wavelength to be added to the multiwavelength signal, and transmits, to a drop port, a wavelength to be dropped from the multiwavelength signal.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference numerals denote similar elements throughout the several views.

DETAILED DESCRIPTION OF THE PRESENTLY PREFERRED EMBODIMENTS

Figure 1:
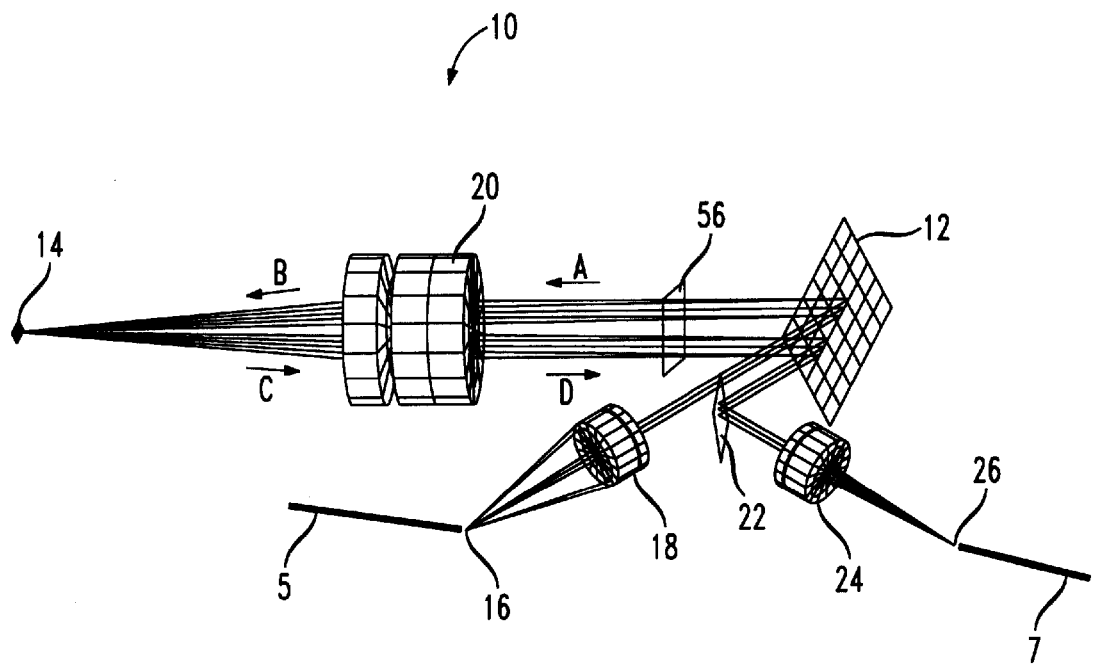
FIG. 1 is a diagrammatic representation of an optical transmit/reflect unit in accordance with the present invention.

The present invention utilizes a modified attenuation unit 10 as shown in FIG. 1, which is the subject of U.S. patent application Ser. No. 08/690,696 filed on Jul. 31, 1996 entitled "Attenuation Device For Wavelength Multiplexed Optical Fiber Communications", the entirety of which is incorporated by reference herein. As shown, unit 10 includes a planar grating wavelength multiplexer 12 and a modulator array 14. Unit 10 has a first port 16 which receives optical signals from an optical fiber 5 carrying multiple wavelengths. The light from the optical fiber 5 input at port 16 is collimated by a collimating lens 18 and is then diffracted by the planar grating 12 so that each wavelength in the optical signal provided to port 16 is dispersed, i.e. the various wavelengths leave the grating 12 at different angles from each other. The dispersed light is then focused by a lens 20 onto the modulator array 14 to produce a column of spots, with each spot position in the column of spots corresponding to a particular wavelength in the input signal.

As explained more fully in the aforementioned U.S. patent application Ser. No. 08/690,696, modulator array 14 has a reflective surface and includes a column of variable attenuators positioned to coincide with the location of spots in the column of spots. The attenuators are reflective micromechanical devices whose reflectivity can be electrically controlled. Each spot corresponding to each wavelength in the focused signal is incident on a different attenuator, thus allowing individual control of the transmitted intensity for each wavelength. The modulator 14 is placed with its reflective surface normal to the optical axis of the unit 10 so that the attenuated light reflected from the modulator 14 can be collected and collimated by a second pass through focusing and collimating lens 20. Lens 20 is positioned such that the original incident beam (the beam travelling in the direction of arrows A and B) illuminates a different region of the surface of lens 20 than the surface illuminated by the reflected beam (the beam travelling in the direction of arrows C and D). In other words, there is no spatial overlapping of the reflective beam with the incident beam on lens 20.

After the attenuated signals from modulator array 14 are collimated by lens 20, the collimated signals propagate back towards the grating 12 which then diffracts the light to combine all of the wavelengths of the collimated signals into the same angle and redirects the light towards the input collimating lens 18. Since, as discussed above, the reflected light is laterally displaced as a result of the position of lens 20, a fold mirror 22 may be introduced to direct only the attenuated reflected light into an output collimating lens 24 which is used to focus the light onto a separate output fiber 7 positioned at a second port 26. In such a configuration, the multiple wavelength attenuator unit 10 can be used as a functionally transmissive component. In other words, light entering from one fiber 5 through first port 16 is affected by the modulator 14 and continues into a separate and distinct output fiber 7 positioned at the second port 26.

Figure 2:
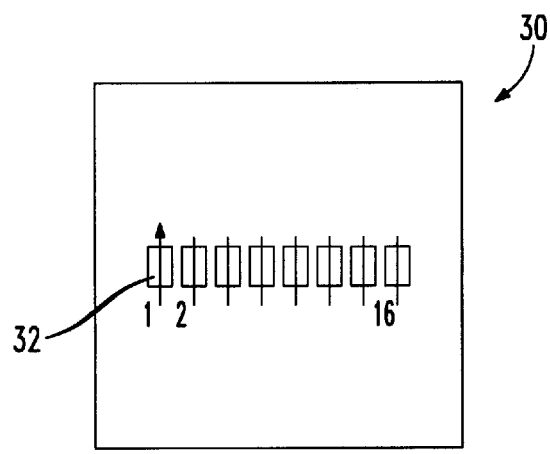
FIG. 2 depicts a single column micromirror array.

In accordance with the present invention, the attenuation unit 10 of FIG. 1 is modified by replacing the modulator array 14 with a micromechanical mirror array; the somodified unit 10 can then be used as a WDM transmit/reflect switch operable in a reflective mode and in a transmissive mode. In the transmissive mode, select wavelengths are directed or transmitted from first port 16 to second port 26. In the reflective mode, select wavelengths input at first port 16 are reflected back to that same port. In particular, and with reference to FIG. 2, a micromechanical mirror array 30 having a plurality of micromirror plates 32 arranged in a single column is shown. Mirror array 30 is designed so that each incoming optical wavelength—which, as explained above, is represented by a spot in a column of spots— illuminates a separate micromirror plate 32 in the micromirror array. Each micromirror plate 32 can be electrically controlled to toggle between two or more angular states so that each micromirror plate will orient its corresponding reflected wavelength into one of two or more directions.

In a preferred embodiment, the micromirror array 30 is designed with an appropriate micromirror plate pitch, tilt angle, and tilt axis such that in one state ("off") the reflected light is directed to the output collimating lens 24 and second port 26, and in the other mirror state ("on") the light is reflected back onto the same path by which it entered the micromirror so that the light is returned to the first collimating lens 18 and directed back to the input fiber through first port 16.

Thus, as explained above, by replacing modulator 14 in the attenuation unit 10 of FIG. 1 with mirror array 30, there is formed a WDM transmit/reflect unit that can operate in a transmissive mode and in a reflective mode. The WDM switch may be placed in an optical fiber path carrying multiple wavelengths to selectively reflect or transmit each individual wavelength, depending on a set of electrical control signals applied to the mirror array plates 32. The response time of the WDM switch is determined by the mirror array 30, i.e. by the toggle time for the individual micromirror plates 32.

In general, it is possible for the WDM switch 10 to operate in three states, namely (i) to reflect a signal input at port 16 back to port 16, (ii) to transmit a signal input at port 16 to port 26 and vice versa; and (iii) to reflect a signal input at port 26 back to port 26. In the transmissive mode wherein the mirror array 30 is set to transmit a particular wavelength from one port to the other, light at the particular wavelength which enters fiber port 16 will be carried to fiber port 26. Similarly, and because of the symmetrical property of the optical path, light at that particular wavelength which enters fiber port 26 will be transmitted to fiber port 16. In a reflective mode, however, the reversible property of the optical path is not present because the angle of the micromirror which reflects one incident beam will cause light from the other port. to be reflected at an angle of twice the original incident angle. Therefore, when the WDM transmit/reflect unit of FIG. 1 operates in a reflective mode to reflect a particular wavelength, light at the particular wavelength which enters fiber port 16 will be reflected back to fiber port 16, i.e. will not be transmitted to fiber port 26. When, on the other hand, light at the particular wavelength enters fiber port 26, the signal will not reflect back to fiber port 26.

Figure 3:
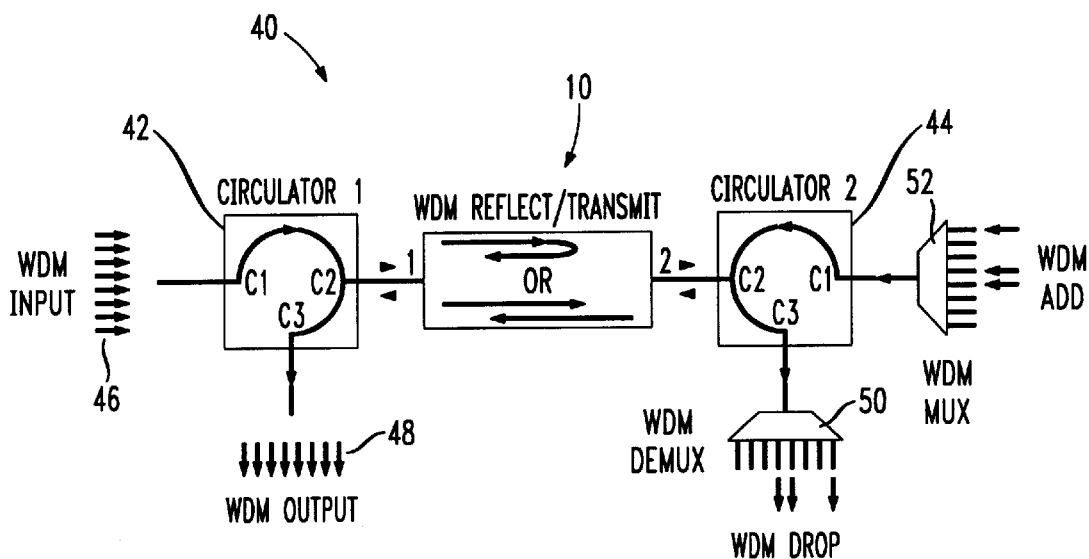
FIG. 3 is a block diagram of a WDM add/drop device in accordance with the present invention.

In accordance with the present invention, the modified two state transmit/reflect unit 10 is used as an element of a WDM add/drop device 40, as illustrated, by way of example, in FIG. 3. As there shown, the WDM transmit/reflect unit 10, i.e. the attenuator shown in FIG. 1 with mirror array 30 (FIG. 2) substituted for modulator 14, is placed between a first and a second 3-port optical circulator 42, 44. A 3-port optical circulator is a commercially available device which transfers an input signal at port C1 to port C2, and which transfers an input signal at port C2 to port C3. The first circulator 42 receives a WDM input data stream 46 and passes it to port 1 (corresponding to the first port 16 in FIG. 1) on the WDM transmit/reflect unit 10. For wavelengths which are to be carried without change (i.e. wavelengths neither added nor dropped), the corresponding micromirrors in switch 10 are set to reflect first port 16, i.e. to reflect those wavelengths back to first port 16. The reflected signals enter circulator 42 through port C2 and are carried by the circulator to port C3, where they continue in the optical network as a WDM output data stream 48.

In the transmissive mode, the inventive WDM add/drop device 40 is configured to add a wavelength to the WDM input 46 only when a wavelength is dropped. Thus, in the transmissive mode, unit 10 is activated to pass or transmit through its second port the wavelength to be dropped to circulator 44 and to pass or transmit the wavelength to be added from circulator 44 to circulator 42. In particular, the transmitted (to-be-dropped) wavelength leaves unit 10 through its fiber port 2 and enters the second circulator 44 through its port C2, and leaves the circulator through a fiber connected to circulator port C3. A router 50 connected to port C3 can be included for WDM demultiplexing so that the dropped wavelength may be directed into separate fibers, as is known in the art to, for example, direct the dropped wavelength to downstream optical network units. Wavelengths that are to be added are provided to an input router 52 which multiplexes the wavelengths to a single fiber connected to port Cl of circulator 44. The incoming (to-be-added) wavelengths at port Cl of circulator 44 will be transmitted by device 10, i.e. by activating the mirror plate 32 corresponding to the added wavelength to transmit the added wavelength. The transmitted added wavelength is then combined onto the WDM output signal 48.

Figure 4:
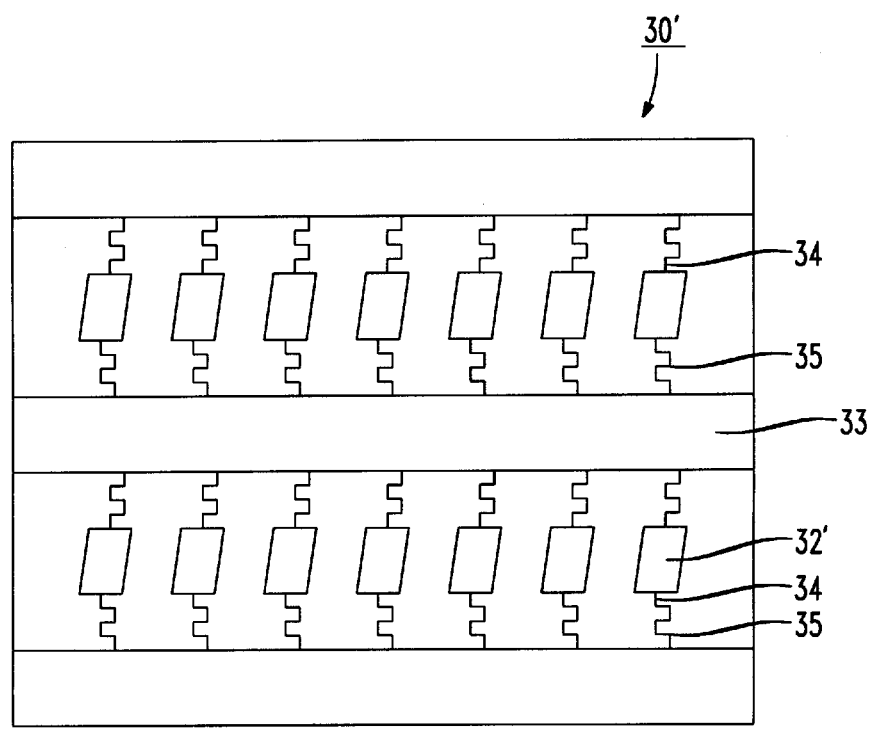
FIG. 4 depicts a dual column micromirror array.

With reference now to FIG. 4, a preferred embodiment of the micromirror array 30 is depicted. As shown, the micromirror array has two columns of mirrors 32' separated by low reflectivity surround 33. The mirrors are deposited on plates suspended between pivots 34 so as to enable them to tilt about an axis. In the preferred embodiment, the tilt axis is chosen so as to provide maximum coupling and minimum crosstalk. The mirror position is controlled by a voltage applied to electrodes 35 connected to individually addressed electrical pads (not shown) located below the mirrors. An electrostatic force that is generated by the applied voltage between the pads and the mirrors 32' deflects the addressed mirror to one of the two angular states.

The WDM add/drop device 40 can be used to simultaneously process more than one multifrequency optical signal. For example, and again with reference to FIG. 1, multiple fibers each carrying a multifrequency signal can be coupled to ports 16 and 26. As will be readily apparent from the foregoing discussion, each optical signal carried by each optical fiber will produce a corresponding column of spots, with the position of each spot in each column corresponding to a particular wavelength. Thus, a pair of input fibers placed side-by-side will create two parallel rows of spots at the micromechanical mirror array 30. By configuring micromechanical mirror array 30 so that it contains multiple columns of mirrors as for example shown in FIG. 4, i.e. a mirror column for each column of spots, multiple optical signals can be simultaneously processed by the micromechanical mirror array 30 through a single WDM add/drop device 40. In other words, a single set of lenses 18, 20 and 24, and a single planar grating 12, all sharing a common alignment, can be used in accordance with the invention to simultaneously process multiple multifrequency optical signals.

In optical fiber components, it is generally important to minimize the polarization dependence loss. However, the diffraction grating 12 used to separate the wavelengths tends to have a different diffraction efficiency for horizontal and for vertical input polarization. This variation can be large, especially for gratings with a relatively fine spatial frequency of several hundred lines per millimeter or more. One way to minimize the net polarization dependence is to pass the polarization dependent element in both directions with a 90 degree polarization rotation between the passes. In this manner, the signal on the first pass experiences a first polarization loss and the return signal experiences a second polarization loss. The result is that any input polarization will experience the average loss.

Any fiber-coupled component can be rendered polarization independent in this manner provided that it can be doubled, where the polarization rotation can be accomplished by an appropriate fiber-coupled device. In the optical system of FIG. 1, the grating 12 is the only component that is polarization dependent, and it is already double passed in that the optical signal is reflected from the grating in a forward direction as shown by arrows A and B, and in a reverse or return direction as shown by arrows C and D. By placing a polarization rotating element 56 into the system, as for example between the grating 12 and lens 20, the losses are averaged in a single round trip through the device 10. One such optical element that can accomplish at least an approximate 90 degree polarization rotation is, by way of example, a quarter wave plate having an appropriate angular orientation with respect to the grating 12. With this simple addition, the polarization dependent losses of the WDM add/drop switch 40 can be reduced.

Although the preferred embodiments are described hereinabove using specific optical elements such as a collimating and focusing lens 20 and a dispersion grating 12 to disperse and focus wavelengths of a multiple-wavelength optical signal, other optical elements can be used to perform this function without departing from the scope of the present invention. For example, a diffractive optical element such as an off-axis holographic lens can be used to perform both imaging and dispersing. For such elements, there is no need for a collimator lens and a collimated beam would not be required. Alternatively, a sequence of volume holographic elements can be used which each element diffracting a single wavelength towards the micromirror array 30 at a distinct angle. Furthermore, a superimposed volume hologram can be used where multiple distinct holograms are recorded in a single volume in individually direct distinct wavelengths. Lastly, a sequence of multilayer dielectric thin film mirrors can be employed with each mirror designed to reflect only a selected subset of wavelengths into a particular angle.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. It is the intention, therefore, to be limited only as indicated by the scope of the claims appended hereto.

We claim:

1. A WDM transmit/reflect unit for selectively transmitting a select wavelength of a multiple-wavelength optical signal from at least one first optic fiber to at least one second optic fiber and reflecting the select wavelength from the at least one first optic fiber back to the at least one first optic fiber, said unit comprising:

a first port for receiving the multiple-wavelength optical signal from the at least one first optic fiber;

a first lens for collimating the received multiple-wavelength optical signal;

means for angularly displacing from each other individual ones of the multiple wavelengths in the collimated multiple-wavelength optical signal when the multiple-wavelength optical signal is travelling in a first direction, and for angularly combining the individual wavelengths of the multiple-wavelength optical signal when the multiple-wavelength optical signal is travelling in a second direction;

a second lens for focusing the angularly displaced wavelengths when the multiple-wavelength signal is travelling in the first direction and for collimating the multiple-wavelength signal when the multiple-wavelength signal is travelling in the second direction;

a micromirror array for receiving the multiple-wavelength signal from the second lens and selectively switchable between a transmission mode for transmitting the select wavelength to the at least one second optic fiber and a reflection mode for reflecting the select wavelength to the at least one first optic fiber;

a second port connected to the second fiber for receiving the deflected angularly combined optical signal from said angularly displacing means when the array is in the transmit mode; and a third lens positioned between said grating and said second port for focusing the angularly combined multiple-wavelength signal onto said second port for receipt by the second fiber.

2. The WDM transmit/reflect unit of claim 1, wherein when said micromirror array is in said transmission mode, and when a second multiple-wavelength signal is present at said second port, the second multiple-wavelength signal is transmitted to said first port.

3. The WDM transmit/reflect unit of claim 1, wherein said micromirror array comprises a plurality of mirror plates, with each plate positioned for receiving one of the individual wavelengths of said multiple-wavelength signal.

4. The WDM transmit/reflect unit of claim 3, wherein each mirror plate is responsive to an electrical signal for selectively activating each plate between the transmission mode and the reflection mode.

5. The WDM transmit/reflect unit of claim 3, wherein each mirror plate is responsive to an electrical signal for selectively reorienting each plate between the transmission mode and the reflection mode.

6. The WDM transmit/reflect unit of claim 3, wherein said micromirror array has a vertical axis, wherein each mirror plate has a vertical axis, and each said mirror plates is arranged so that its vertical axis is angularly offset from the vertical axis of said mirror array.

7. The WDM transmit/reflect unit of claim 6, wherein each said mirror plate of the micromirror array is selectively rotatable about its axis to transmit or reflect select wavelengths of the multiple-wavelength optical signal.

8. The WDM transmit/reflect unit of claim 1, wherein said angularly displacing means comprises a grating.

9. The WDM transmit/reflect unit of claim 3, wherein said plural mirror plates are arranged in a column.

10. The WDM transmit/reflect unit of claim 3, wherein the at least one first optic fiber comprises a first plurality of optic fibers, each providing a multiple-wavelength optical signal to said first port, wherein the at least one second optic fiber comprises a second plurality of optic fibers, equal in number to the plurality of first optic fibers and each of the second optic fibers receiving an angularly combined deflected multiple-wavelength signal from said second port, and wherein said plural mirror plates are arranged to form a plurality of columns of said mirror plates equal in number of columns to the plurality of optic fibers in the first plurality of optic fibers, and wherein each said column of mirror plates comprises a plural number of mirror plates at least equal to the multiple wavelengths in each multiple wavelength optical signal.

11. The WDM transmit/reflect unit of claim 1, further comprising a deflecting element positioned between said angularly displacing means and said third lens for deflecting the angularly combined multiple-wavelength signal to the at least one second optic fiber when the array is in the transmitting mode.

12. The WDM transmit/reflect unit of claim 1, further comprising a polarization dependent optical component positioned between said angularly displacing means and said second lens.

13. The WDM transmit/reflect unit of claim 12, wherein said polarization dependent optical component comprises a quarter-wave plate.

14. A WDM add/drop device for adding wavelengths to and dropping wavelengths from a multiple-wavelength optical signal in an optical communication system, comprising:

an input port for receiving a WDM multiple-wavelength input optical signal from at least one first optic fiber;

an output port for outputting a WDM multiple-wavelength output optical signal to at least one second optic fiber;

a WDM add port for receiving as an input an add wavelength to be added to the multiple-wavelength optical signal;

a WDM transmit/reflect unit having a first port and a second port for transmitting one of the multiple wavelengths of the multiple-wavelength signal from the first port to the second port in a first direction, for transmitting the added wavelength from the second port to the first port in a second direction, and for reflecting one of the multiple wavelengths of the multiple-wavelength signal from the first port back to the first port;

a first multiport circulator disposed between said WDM input port, said WDM output port and said first port of said WDM transmit/reflect unit, said circulator being operable for receiving the WDM multiple-wavelength input signal from said input port and providing the WDM input signal to said first port of said WDM transmit/reflect unit and for receiving the WDM multiple-wavelength signal reflected by said WDM transmit/reflect unit and the added wavelength transmitted by said WDM transmit/reflect unit and providing the received reflected WDM multiple-wavelength signal and added wavelength to said output port;

a WDM drop port for outputting from the WDM input signal, one of the multiple wavelengths dropped from the WDM multiple-wavelength optical signal transmitted by said WDM transmit/reflect unit; and a second circulator disposed between said WDM add port, said WDM drop port and said second port of said WDM transmit/reflect unit for forwarding one of the multiple transmitted wavelengths from the WDM transmit/reflect unit to said WDM drop port and for forwarding the WDM added wavelength from said WDM add port to said second port of said WDM transmit/reflect unit.

15. The WDM add/drop device of claim 14, wherein said WDM transmit/reflect unit further comprises a micromirror array having a plurality of mirror plates, with each plate positioned for receiving one of the wavelengths of said multiple-wavelength input optical signal, and means for optical wavelength demultiplexing of the multiple wavelength signal onto said plurality of mirror plates.

16. The WDM add/drop device of claim 15, wherein each mirror plate in said micromirror array is responsive to an electrical signal for selectively activating each plate between transmission and reflection modes of the WDM transmit/reflect unit.

17. The WDM add/drop device of claim 15, wherein each mirror plate in said micromirror array is responsive to an electrical signal for selectively reorienting each plate between a transmission mode and a reflection mode.

18. The WDM add/drop device of claim 15, wherein said micromirror array has a vertical axis, wherein each mirror plate has a vertical axis, and wherein each said mirror plate is arranged so that its vertical axis is angularly offset from the vertical axis of said mirror array.

19. The WDM add/drop device of claim 15, wherein each said mirror plates of the micromirror array is selectively rotatable about its axis to transmit or reflect select wavelengths of the multiple-wavelength optical signal.

20. The WDM add/drop device of claim 15, wherein said plural mirror plates are arranged in a column.

21. The WDM add/drop device of claim 15, wherein said first port comprises a first port on a multiple port circulator and said second port comprises a second port on said multiple port circulator, wherein the at least one first optic fiber comprises a first plurality of optic fibers, each providing a multiple-wavelength optical signal to said first port, wherein the at least one second optic fiber comprises a second plurality of optic fibers, equal in number to the plurality of first optic fibers and each of the second optic fibers receiving an output multiple-wavelength optical signal from said second port, and wherein said plural mirror plates are arranged to form a plurality of columns of said mirror plates equal in number of columns to the plurality of optic fibers in the first plurality of optic fibers, and wherein each said column of mirror plates comprises a plural number of mirror plates at least equal to the multiple wavelengths in each multiple-wavelength optical signal.

22. A WDM transmit/reflect unit for selectively transmitting a select wavelength of a multiple-wavelength optical signal from a first optic fiber to a second optic fiber and reflecting the select wavelength from the first optic fiber back to the first optic fiber, said unit comprising:

a first port for receiving the multiple-wavelength optical signal from the first fiber;

means for angularly displacing from each other individual ones of the multiple wavelengths in the multiple-wavelength optical signal when the multiple-wavelength optical signal is travelling in a first direction, and for angularly combining the individual wavelengths of the multiple-wavelength optical signal when the multiple-wavelength optical signal is travelling in a second direction;

first means for imaging the angularly displaced multiple-wavelength optical signal to form an image;

a micromirror array for receiving the image from said first imaging means, said micromirror array being selectively switchable between a transmission mode for transmitting the select wavelength to the second fiber and a reflection mode for reflecting the select wavelength to the first fiber;

said first imaging means operatively imaging the reflected select wavelength at said first port for receipt by the first optic fiber when said micromirror array is in said reflection mode;

second imaging means for imaging the transmitted select wavelength when said micromirror array is in said transmission mode; and a second port connected to the second fiber for receiving the image of the transmitted select wavelength from said second imaging means.

23. The WDM transmit/reflect device of claim 22, wherein said means for angularly displacing individual ones of the multiple wavelengths comprises an optical grating.

24. The WDM transmit/reflect device of claim 22, wherein said first imaging means comprises a lens disposed between said angularly displacing means and said micromirror array.

25. The WDM transmit/reflect device of claim 24, wherein said first imaging means further comprises a focusing lens disposed between said angularly displacing means and said first port for focusing the image of the reflected wavelength on said first port.

26. The WDM transmit/reflect device of claim 24, wherein said second imaging means comprises a focusing lens disposed between said angularly displacing means and said second port for focusing the image of the transmitted wavelength on said second port.

* * * * *